US010623439B2

United States Patent
Nakamura et al.

(10) Patent No.: US 10,623,439 B2
(45) Date of Patent: Apr. 14, 2020

(54) COMPUTER SYSTEM AND CONTROL METHOD THEREOF

(71) Applicant: HITACHI, LTD., Tokyo (JP)

(72) Inventors: Yoshifumi Nakamura, Tokyo (JP); Eiichi Inoue, Tokyo (JP)

(73) Assignee: HITACHI, LTD., Tokyo (JP)

( * ) Notice: Subject to any disclaimer, the term of this patent is extended or adjusted under 35 U.S.C. 154(b) by 89 days.

(21) Appl. No.: 15/745,334

(22) PCT Filed: Jan. 15, 2016

(86) PCT No.: PCT/JP2016/051159
§ 371 (c)(1),
(2) Date: Jan. 16, 2018

(87) PCT Pub. No.: WO2017/122353
PCT Pub. Date: Jul. 20, 2017

(65) Prior Publication Data
US 2018/0212979 A1 Jul. 26, 2018

(51) Int. Cl.
*H04L 29/06* (2006.01)
*G06F 21/56* (2013.01)
*G06F 21/55* (2013.01)

(52) U.S. Cl.
CPC .......... *H04L 63/145* (2013.01); *G06F 21/554* (2013.01); *G06F 21/566* (2013.01);
(Continued)

(58) Field of Classification Search
CPC ............... H04L 63/145; H04L 63/1408; H04L 63/1416; H04L 63/1425; H04L 63/0236; G06F 21/554; G06F 21/566
See application file for complete search history.

(56) References Cited

U.S. PATENT DOCUMENTS

| 7,685,281 B1* | 3/2010 | Saraiya | G06F 13/387 370/392 |
| 2004/0049698 A1* | 3/2004 | Ott | G06F 21/554 726/23 |
| 2004/0073806 A1 | 4/2004 | Zimmer | |

(Continued)

FOREIGN PATENT DOCUMENTS

| JP | 11-073384 A | 3/1999 |
| JP | 2006-501581 A | 1/2006 |

(Continued)

OTHER PUBLICATIONS

Wonghirunsombat et al., A Centralized Management Framework of Networkbased Intrusion Detection and Prevention System, May 2013, 10th International Joint Conference on Computer Science and Software Engineering, pp. 183-188) (Year: 2013).*

(Continued)

*Primary Examiner* — Kenneth W Chang
(74) *Attorney, Agent, or Firm* — Volpe and Koenig, P.C.

(57) ABSTRACT

A computer system is reliably protected from unauthorized access. The present invention provides a computer system comprising a plurality of service computers each capable of performing predetermined services, and a management computer which manages each of the plurality of service computers. Each of the plurality of service computers comprises a controller which executes an operating system, and a management processor for managing computer hardware. The controller executes a monitoring program which manages predetermined events. The management processor sends information of a detected event to the management computer via a port for connecting to the management computer.

12 Claims, 16 Drawing Sheets

(52) U.S. Cl.
CPC ...... *H04L 63/1408* (2013.01); *H04L 63/1416* (2013.01); *H04L 63/1425* (2013.01); *H04L 63/0236* (2013.01)

(56) References Cited

U.S. PATENT DOCUMENTS

| | | | | |
|---|---|---|---|---|
| 2005/0125687 | A1* | 6/2005 | Townsend | G06F 21/55 726/26 |
| 2007/0245404 | A1 | 10/2007 | Okano | |
| 2007/0256127 | A1* | 11/2007 | Kraemer | G06F 21/552 726/23 |
| 2008/0005748 | A1* | 1/2008 | Mathew | G06F 11/0712 719/318 |
| 2008/0083030 | A1* | 4/2008 | Durham | G06F 8/656 726/22 |
| 2009/0125901 | A1* | 5/2009 | Swanson | G06F 9/45558 718/1 |
| 2009/0158432 | A1* | 6/2009 | Zheng | G06F 21/562 726/24 |
| 2010/0083381 | A1 | 4/2010 | Khosravi et al. | |
| 2010/0223669 | A1* | 9/2010 | Vermeulen | H04L 63/0236 726/23 |
| 2012/0047366 | A1 | 2/2012 | Yoo | |
| 2014/0129698 | A1* | 5/2014 | Seago | G06F 9/542 709/224 |
| 2014/0373091 | A1* | 12/2014 | Kirner | H04L 63/1416 726/1 |
| 2015/0007254 | A1* | 1/2015 | Hsiung | H04L 63/20 726/1 |
| 2015/0212842 | A1* | 7/2015 | Ghosh | G06F 9/45533 718/1 |
| 2016/0070929 | A1* | 3/2016 | Potlapally | G06F 21/64 726/26 |

FOREIGN PATENT DOCUMENTS

| | | |
|---|---|---|
| JP | 2007-265023 A | 10/2007 |
| JP | 2010-086538 A | 4/2010 |
| JP | 2012-043439 A | 3/2012 |

OTHER PUBLICATIONS

International Search Report dated Apr. 12, 2016 for the International Application No. PCT/JP2016/051159.

* cited by examiner

FIG.4

| PORT IDENTIFIER | IP ADDRESS | STATUS | PORT TYPE |
|---|---|---|---|
| eth0 | 10.0.0.1 | BLOCKED | SERVICE |
| eth1 | 192.168.0.2 | VALID | MANAGEMENT |

FIG.5

>ipmitool raw 0x02 0xc0 0x01 0x01 0x02 0x03 0x04 0x05 0x06
              500  502  504

FIG.6

| OCCURRED EVENT | COMMAND PARAMETER |
|---|---|
| VIRUS INFECTION | 01 |
| UNAUTHORIZED ACCESS | 02 |
| DoS ATTACK | 03 |
| RESTORATION FROM ABNORMALITY | 04 |

FIG.8

| Event parameter | Occurred event | Configuration change content | | | |
|---|---|---|---|---|---|
| | | Switch | | OS to be managed | |
| | | Case | Action | Case | Action |
| 01 | Virus detection | VLAN is set in robust OS other than infected OS so that virus entry route is included | Block entry port Change setting of VLAN so that entry port is not included | Change of setting of VLAN of switch | Change VLAN ID pursuant to change of setting of VLAN of switch |
| | | VLAN is set in robust OS so that entry route is not included | Blocking of entry port will be sufficient | — | — |
| | | VLAN has not been set | Block entry port Set VLAN so that entry port is not included | Setting of VLAN of switch | Set VLAN ID pursuant to setting of VLAN of switch |
| 02 | Unauthorized access | VLAN configuration change ※1 | Restrict MAC address VLAN configuration change ※1 | VLAN configuration change ※1 | VLAN configuration change ※1 |
| 03 | DoS attack | VLAN configuration change ※1 | VLAN configuration change ※1 | VLAN configuration change ※1 | VLAN configuration change ※1 Restrict access from same IP address |
| 04 | Recovery from abnormality | — | — | Apply VLAN, which has been set in robust OS, to recovered OS | — |

※1 Pursuant to method of changing VLAN configuration upon detection of virus.

FIG.9

| MANAGE-MENT OBJECT IDENTIFIER | BMC IP ADDRESS | OCCURRED EVENT | OS PORT IP ADDRESS | PORT TYPE | PORT STATUS | VIRTUAL MACHINE MONITOR IP ADDRESS | CONFIGU-RATION |
|---|---|---|---|---|---|---|---|
| SERVER 1 | 192.168.0.3 | NORMAL | 192.168.0.7 | MANAGEMENT | VALID | — | XX |
|  |  |  | 10.0.0.1 | SERVICE | VALID | — | XX |
| SERVER 2 | 192.168.0.4 | VIRUS INFECTION | 192.168.0.8 | MANAGEMENT | INVALID | 192.168.0.13 | XX |
|  |  |  | 10.0.0.2 | SERVICE | INVALID |  | XX |
| SERVER 3 |  | NORMAL | 192.168.0.9 | MANAGEMENT | VALID |  | XX |
|  |  |  | 10.0.0.3 | SERVICE | VALID |  | XX |
|  |  |  | 10.0.0.4 | SERVICE | VALID |  | XX |
| SERVER 4 | 192.168.0.5 | NORMAL | 192.168.0.10 | MANAGEMENT | VALID | 192.168.0.14 | XX |
|  |  |  | 10.0.0.5 | SERVICE | VALID |  | XX |
| SERVER 5 |  | NORMAL | 192.168.0.11 | MANAGEMENT | VALID |  | XX |
|  |  |  | 10.0.0.6 | SERVICE | VALID |  | XX |
|  |  |  | 11.0.0.7 | SERVICE | VALID |  | XX |
| SWITCH 1 | — | FIG. 10 |  |  |  | — | XX |

FIG.10

| MANAGE-MENT OBJECT IDENTIFIER | OCCURRED EVENT | PORT IP ADDRESS | PORT IDENTIFIER | PORT TYPE | PORT STATUS | CONFIGURATION |||
|---|---|---|---|---|---|---|---|---|
| | | | | | | VLAN ID | INTERNAL CONNEC-TION | CONNEC-TION DESTI-NATION |
| SWITCH 1 | NORMAL | 192.168.0.12 | PORT 0 | MANAGE-MENT | VALID | — | — | MANAGE-MENT SERVER |
| | NORMAL | 10.0.0.9 | PORT 1 | SERVICE | VALID | 110 120 | PORT A PORT B | SERVER 1 SERVER 2 SERVER 3 |
| | NORMAL | 10.0.0.10 | PORT 2 | SERVICE | VALID | 110 120 | PORT A PORT B | SERVER 1 SERVER 2 SERVER 3 |
| | NORMAL | 10.0.0.11 | PORT 3 | SERVICE | VALID | 110 120 | PORT A PORT B | SERVER 1 SERVER 2 SERVER 3 |
| | NORMAL | 10.0.0.12 | PORT A | SERVICE | VALID | 110 120 | PORT 1 PORT 2 PORT 3 | EXTERNAL LAN |
| | NORMAL | 10.0.0.13 | PORT B | SERVICE | VALID | 110 120 | PORT 1 PORT 2 PORT 3 | EXTERNAL LAN |

CONFIGURATION DIAGRAM - UPON NORMAL OPERATION

FIG.13

| MANAGE-MENT OBJECT IDENTIFIER | OCCURRED EVENT | PORT IP ADDRESS | PORT IDENTIFIER | PORT TYPE | PORT STATUS | CONFIGURATION | | |
|---|---|---|---|---|---|---|---|---|
| | | | | | | VLAN ID | INTERNAL CONNEC-TION | CONNEC-TION DESTI-NATION |
| SWITCH 1 | NORMAL | 192.168.0.12 | PORT 0 | MANAGE-MENT | VALID | — | — | MANAGE-MENT SERVER |
| | VIRUS INFECTION | 10.0.0.09 | PORT 1 | SERVICE | VALID | 110 | — | SERVER 1 |
| | NORMAL | 10.0.0.10 | PORT 2 | SERVICE | VALID | 120 | PORT B | SERVER 2 |
| | NORMAL | 10.0.0.11 | PORT 3 | SERVICE | VALID | 120 | PORT B | SERVER 3 |
| | NORMAL | 10.0.0.12 | PORT A | SERVICE | BLOCKED | 110 | — | EXTERNAL LAN |
| | NORMAL | 10.0.0.13 | PORT B | SERVICE | VALID | 120 | PORT 2 PORT 3 | EXTERNAL LAN |

FIG.14

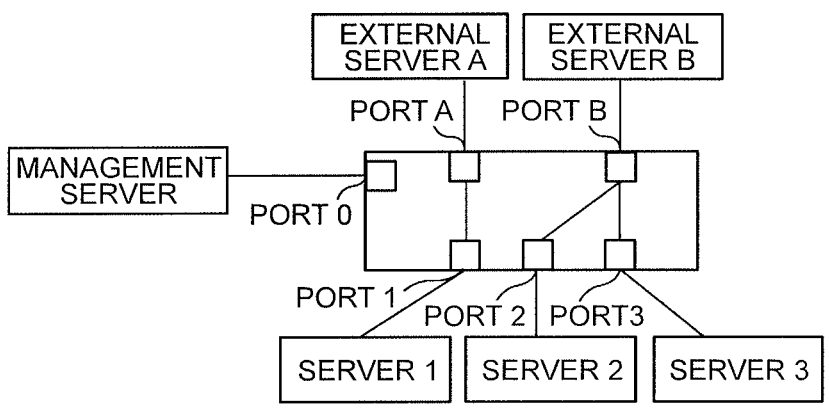

FIG.15

| MANAGE-MENT OBJECT IDENTIFIER | OCCURRED EVENT | PORT IP ADDRESS | PORT IDENTIFIER | PORT TYPE | PORT STATUS | CONFIGURATION | | |
|---|---|---|---|---|---|---|---|---|
| | | | | | | VLAN ID | INTERNAL CONNEC-TION | CONNEC-TION DESTI-NATION |
| SWITCH 1 | NORMAL | 192.168.0.12 | PORT 0 | MANAGE-MENT | VALID | — | — | MANAGE-MENT SERVER |
| | NORMAL | 10.0.0.09 | PORT 1 | SERVICE | VALID | 110 | PORT A | SERVER 1 |
| | NORMAL | 10.0.0.10 | PORT 2 | SERVICE | VALID | 120 | PORT B | SERVER 2 SERVER 3 |
| | NORMAL | 10.0.0.11 | PORT 3 | SERVICE | VALID | 120 | PORT B | SERVER 2 SERVER 3 |
| | NORMAL | 10.0.0.12 | PORT A | SERVICE | VALID | 110 | PORT 2 PORT 3 | EXTERNAL LAN |
| | NORMAL | 10.0.0.13 | PORT B | SERVICE | VALID | 120 | PORT 2 PORT 3 | EXTERNAL LAN |

FIG.16

| MANAGE-MENT OBJECT IDENTIFIER | OCCURRED EVENT | PORT IP ADDRESS | PORT IDENTIFIER | PORT TYPE | PORT STATUS | CONFIGURATION ||| 
|---|---|---|---|---|---|---|---|---|
| | | | | | | VLAN ID | INTERNAL CONNEC-TION | CONNEC-TION DESTI-NATION |
| SWITCH 1 | NORMAL | 192.168.0.12 | PORT 0 | MANAGE-MENT | VALID | — | — | MANAGE-MENT SERVER |
| | VIRUS INFECTION | 10.0.0.09 | PORT 1 | SERVICE | VALID | 110 | — | SERVER 1 |
| | NORMAL | 10.0.0.10 | PORT 2 | SERVICE | VALID | 120 | PORT B | SERVER 2 |
| | NORMAL | 10.0.0.11 | PORT 3 | SERVICE | VALID | 120 | PORT B | SERVER 3 |
| | NORMAL | 10.0.0.12 | PORT A | SERVICE | BLOCKED | 110 | — | EXTERNAL LAN |
| | NORMAL | 10.0.0.13 | PORT B | SERVICE | VALID | 120 | PORT 2 PORT 3 | EXTERNAL LAN |

COMPUTER SYSTEM AND CONTROL METHOD THEREOF

TECHNICAL FIELD

The present invention relates to a computer system, and particularly relates to a computer system comprising a service computer capable of performing predetermined services, and a management computer which manages the service computer, as well as to a control method thereof.

BACKGROUND ART

In recent years, pursuant to the expansion and development of the information-oriented society, numerous computer systems are in existence. And many of these computer systems are mutually connected via a communication network such as the internet, and exchange information and perform information processing by coordinating with each other.

These types of computer systems are under information attack known as cyber attack, and this trend is getting even worse. Thus, computer systems are equipped with a defense mechanism against unauthorized or malicious access resulting from computer viruses and Dos attacks (Denial of Service attacks). Anti-virus software against computer viruses is one such example. Furthermore, computer systems are configured to additionally prevent the diffusion and propagation of unauthorized events.

For example, Japanese Patent Application Publication No. H11-73384 discloses that its object is to provide an information processing device capable of preventing the network propagation of computer viruses by dynamically changing the logical connection and non-connection with the network in an information processing device such as a computer connected to a network, whereby a network connection and non-connection command is issued dynamically to a network connection mechanism based on a network separation program in order to realize the connection and non-connection with the network, and a control signal is sent to the operating system and the virus check program so that the information processing device is set to be in a simulated stand-alone state while the virus check processing is being executed, and the network diffusion of viruses during the virus check processing can thereby be prevented.

Furthermore, Japanese Patent Application Publication No. 2007-265023 discloses an information processing device which includes a network device and is connected to a network via the network device in order to reliably prevent the diffusion of computer viruses on a network, wherein the information processing device comprises a discontinuation processing unit which discontinues the function of the network device based on a disconnection instruction signal for instructing the disconnection from the network, and a setting unit which invalidates the function of the network device and sets the network device to be in a locked state which can only be unlocked by a specific authorized person based on the disconnection instruction signal.

CITATION LIST

Patent Literature

[PTL 1] Japanese Patent Application Publication No. H11-73384

[PTL 2] Japanese Patent Application Publication No. 2007-265023

SUMMARY OF THE INVENTION

Problems to be Solved by the Invention

Nevertheless, even when the computer that was subject to unauthorized access is disconnected from the network as with the conventional technologies described above, it was not possible to eliminate the possibility that the unauthorized access would become diffused to the computer system. Thus, an object of the present invention is to reliably protect a computer system from unauthorized access.

Means to Solve the Problems

In order to achieve the foregoing object, the present invention provides a computer system, comprising: a plurality of service computers each capable of performing predetermined services; and a management computer which manages each of the plurality of service computers, wherein each of the plurality of service computers comprises: a controller which executes an operating system; and a management processor for managing computer hardware, wherein the controller executes a monitoring program which manages predetermined events, and wherein the management processor sends information of a detected event to the management computer via a port for connecting to the management computer.

Furthermore, the second invention is a method of controlling a computer, comprising the steps of: a computer, comprising a controller which executes an operating system, executing services while using the controller to monitor events including an infection of a computer virus; and when the event is detected, sending information of the event to a management computer via a dedicated processor for managing computer hardware of the computer.

Advantageous Effects of the Invention

As described above, according to the present invention, it is possible to reliably protect a computer system from unauthorized access.

BRIEF DESCRIPTION OF DRAWINGS

FIG. 4 is a table showing an example of the port configuration of the server.

FIG. 5 is a diagram showing an example of the IPMI command.

FIG. 6 is a diagram showing an example of a table which converts the occurred event into parameters.

FIG. 8 is a diagram showing an example of the event response table indicating how the network configuration of the server should be changed in response to the occurred event.

FIG. 9 is a diagram showing an example of a table for managing the management object by the management computer.

FIG. 10 is a diagram showing an example of the switch management object table for managing the configuration of the switch.

FIG. 13 is a block diagram showing the configuration of the switch illustrated in FIG. 12.

FIG. 14 is yet another example of the switch management object table for managing the configuration of the switch.

FIG. 15 is a block diagram showing the configuration of the switch illustrated in FIG. 14.

FIG. 16 is a diagram showing the switch management object table which changes the switch configuration illustrated in FIG. 15.

DESCRIPTION OF EMBODIMENTS

Figure 1:
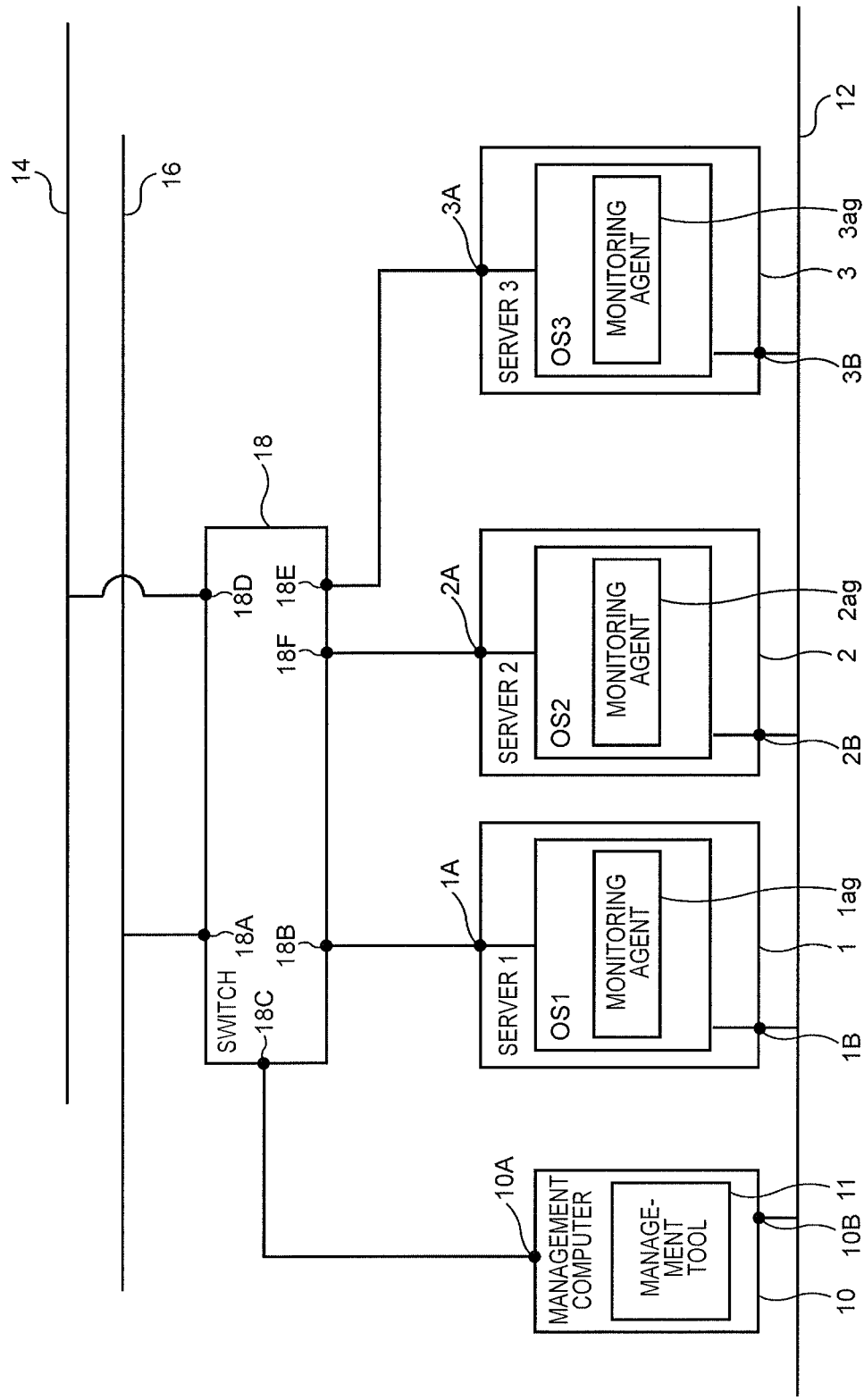
FIG. 1 is a block diagram showing an example of the hardware of the computer system.

An embodiment of the present invention is now explained. Foremost, FIG. 1 is a diagram schematically showing the hardware of the computer system. The computer system comprises a plurality of servers (1, 2, 3), and a management computer 10. Each of the plurality of servers performs predetermined services for a client computer.

The management computer 10 is connected to each of the plurality of servers via a management communication channel (management LAN) 12. The plurality of servers are connected to a plurality of external communication channels via a switch 18. Reference numeral 14 represents an external LAN 1, and reference numeral 16 represents an external LAN 2. The switch 18 routes the plurality of external communication channels to the plurality of servers.

Reference numeral 18A represents an external connection port for connecting to the service LAN 2 (16) of the switch 18, and reference numeral 18D represents an external connection port for connecting to the service LAN 1 (14) of the switch 18. A port 18B of the switch 18 is connected to an internal port 1A of the server 1, a port 18F of the switch 18 is connected to an internal port 2A of the server 2, and a port 18E of the switch 18 is connected to an internal port 3A.

A port 10A of the management computer 10 is connected to a management port 18C of the switch 18, and a port 10B is connected to a management port 1B of the server 1, a management port 2B of the server 2, and a management port 3B of the server 3, respectively, via the management LAN 12.

The hardware resources and software resources of the management computer 10 realize the setting of the configuration of the plurality of servers 1 to 3 and the switch 18, and the management tools for managing the operation thereof. The management of the servers and the switch by the management computer 10 includes the blocking or opening of the ports of the servers and the switch, change of the connection relationship among the plurality of servers, and change of the routing of the switch. Each of the servers 1 to 3 runs the operating system and performs predetermined services and causes the operating system (OS) to run a monitoring agent (1ag, 2ag, 3ag) for monitoring predetermined events such the occurrence of unauthorized access caused by a computer virus or the like, and thereby protects the server from being subject to information attack.

As the operating system of a server, there are a plurality of types depending on the system, and, for instance, known are Windows Server, and Solaris as the Unix-based OS. The server may be any one among a file server, a database server, an email server, and a Web server.

For example, when the monitoring agent 1ag of the server 1 detects a computer virus as an unauthorized event, the monitoring agent 1ag blocks the internal port 1A of the switch 18 and the internal port 1B of the management LAN 12 and isolates the server 1 from the computer system, and thereby prevents the computer virus from propagating or becoming diffused to other servers 2, 3 and the management computer 10.

When the operating system of the server 1 detects an unauthorized event, the operating system immediately blocks the service port 1A and the management port 1B of the server 1 so that the unauthorized event will not become diffused to the computer system without even notifying the detection of the unauthorized event to the management computer 10.

Meanwhile, when the management computer 10 independently determines that the isolation of the server 1 was caused by an unauthorized event involving the server, the management computer 10 isolates all servers of the computer system to prevent the diffusion of the unauthorized event, and blocks the external port of the switch, which was the entry route of the unauthorized event, to prevent the further influence of the unauthorized event.

Nevertheless, if there is even a slight time lag until the management computer 10 disconnects the diffusion route or the infection route, there is a possibility that the unauthorized event will spread to the computer system. Meanwhile, if a normal server that is not affected by the unauthorized event is also isolated, then it will not be possible to continue performing services at all.

Thus, with the computer system, it will suffice if the server 1 that was affected by an unauthorized event can notify the detection of an unauthorized event to the management computer without going through the operating system. According to this configuration, the management computer 10 can receive the notification of the occurrence of an unauthorized event from the server without being affected by the unauthorized event. The notification of an unauthorized event from the server to the management computer 10 without going through the operating system can be realized, for example, by utilizing a system management processor of the server.

The system management processor is mounted on a baseboard, and as types that are mounted on an Intel Architecture-based on CPU machine, known are a BMC (Baseboard Management Controller) and an ISMP (Integrated Systems Management Processors). The system management processor can monitor the server's hardware components such as the CPU, bus, fan, temperature sensor and voltage and send monitoring information to the management computer as an independent and dedicated processor that is not dependent on the server's CPU and operating system.

Furthermore, the system management processor is operated according to a dedicated interface, such as an IPMI (Intelligent Platform Management Interface), that is not dependent on a specific hardware system or operating system. As the current IPMI, version V2.0 is being provided. Even when an unauthorized event is notified from the operating system to the system management processor, so as long as the notification is based on a dedicated interface such as the IPMI, it could be said that there is no possibility of the unauthorized event invading the notification.

In the ensuing explanation, a BMC will be used as the system management processor. The BMC monitors the server hardware, and creates a message of the status thereof according to an IPMI and manages the message. The IPMI is an interface for sending and receiving message events, and the server's BMC can send the IPMI message to the management computer through access based on the IPMI specification.

By using a command that is dependent on the IPMI specification, the operating system can access the BMC and notify predetermined information. The IPMI command includes an area (OEM area) that is open to the user, and the unauthorized event monitoring system (monitoring agent) can set predetermined information, in particular the detection of unauthorized events and the entry routes of unauthorized events, in the OEM area. Because the IPMI command is not dependent on the operating system, it could be said that there is no possibility of the computer virus invading the IPMI command.

The BMC can determine that an unauthorized event (computer virus) has occurred based on the IPMI command, and output the unauthorized event from the management port of the BMC to the management computer via the management LAN 12. Because the server 1 outputs the detection of an unauthorized event from the port of the BMC to the management computer 10 while blocking the internal ports 1A, 1B, the management computer 10 can promptly learn that an unauthorized event occurred in the server 1.

Figure 2:
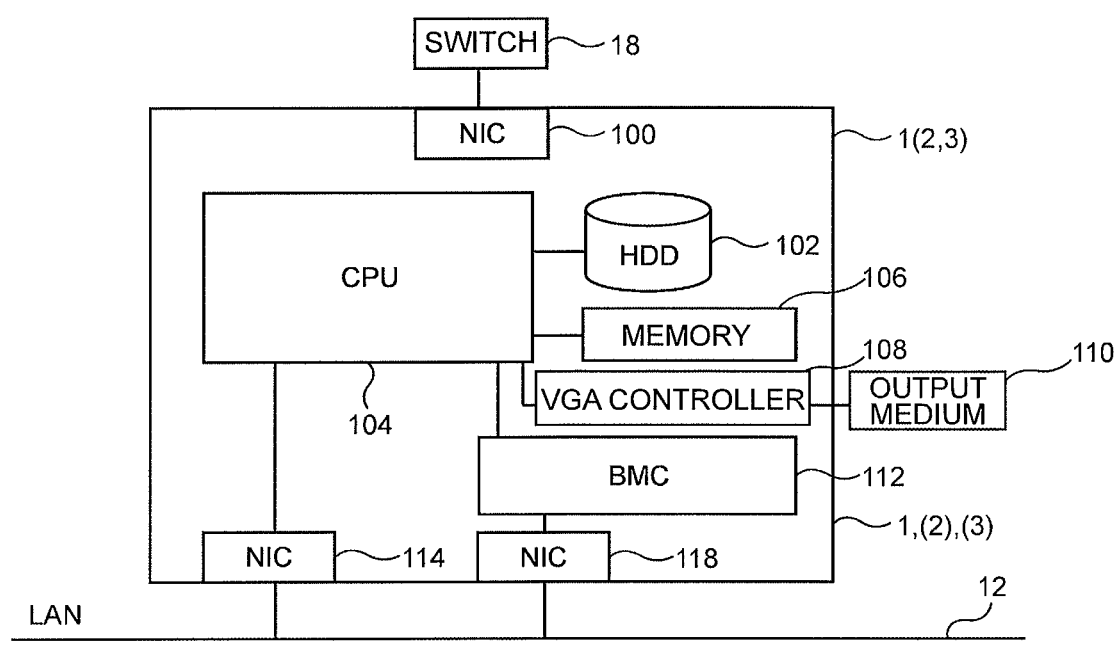
FIG. 2 is a diagram showing an example of the hardware configuration of the server 1 (2, 3).

The computer system is now explained in detail. FIG. 2 is a diagram showing an example of the hardware configuration of the server 1 (2, 3). The server comprises a CPU 104 which executes arithmetic processing for realizing predetermined services based on the operating system, a storage apparatus (HDD) 102 which stores user data and the like, a memory 106 which stores management tables and control programs, a VGA controller 108 as a console for outputting a user interface to an output medium 110 such as a monitor, an NIC (Network Interface Card) 118 comprising a port for connecting the BMC 112 to the management LAN 12, an NIC 114 comprising a port for connecting the CPU 104 (operating system) to the management LAN 12, and an NIC 100 which forms a port for connecting the CPU 104 (operating system) to the switch 18.

The server 1 provides predetermined services to the user (client computer) by connecting to the external server via the external LANs 14, 16, and receives management processing from the management computer 10 by connecting to the management computer 10 via the management LAN 12. As the management processing, for example, the network configuration among the plurality of servers can be changed. The BMC 112 is connected to the CPU 104 via an internal bus based on an IPMB (Intelligent Platform Management Bus) as the IPMI bus specification. Accordingly, the BMC 112 can be connected to the server's operating system.

Figure 3:
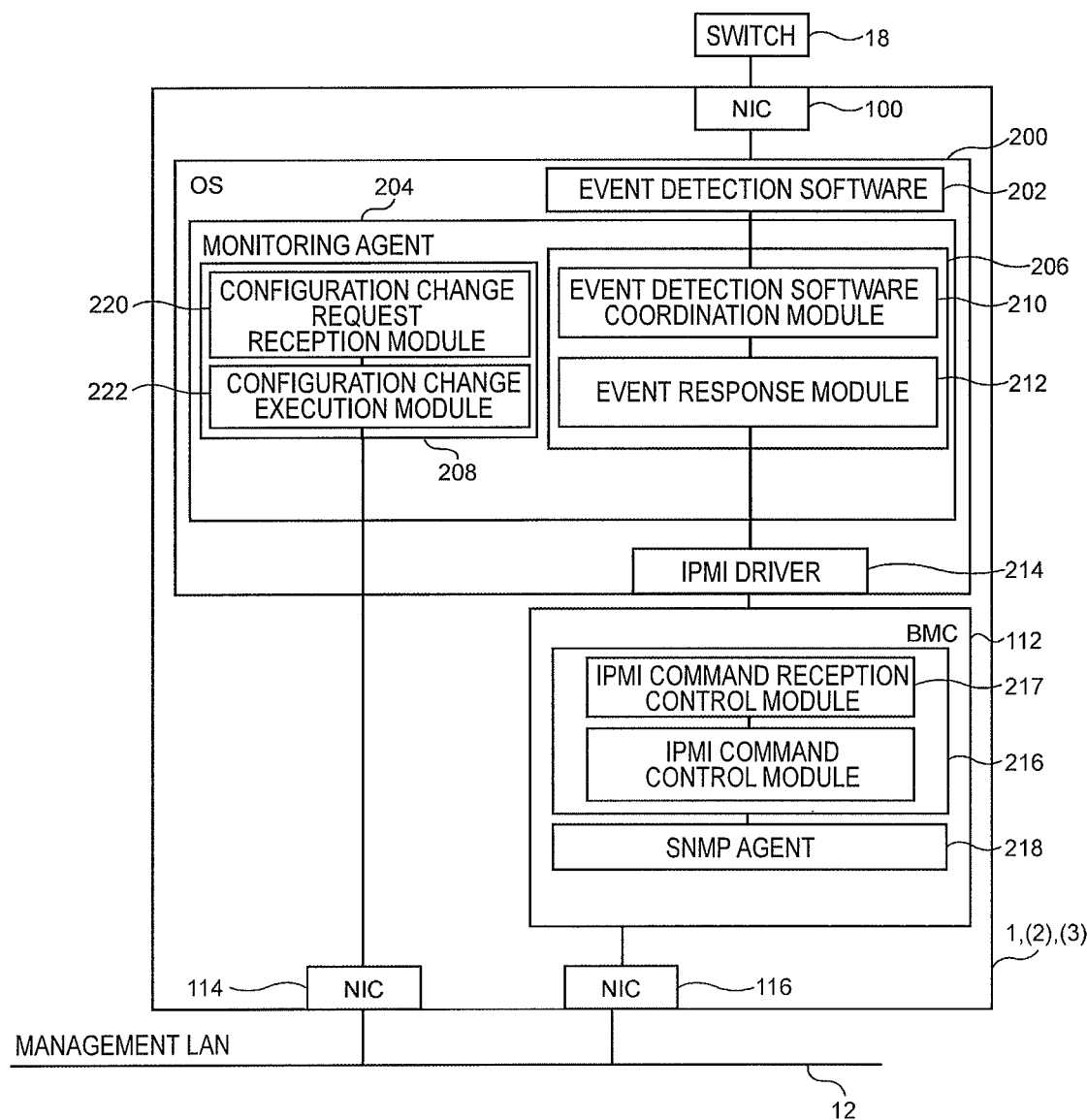
FIG. 3 is a functional block diagram of the server.

The functional block diagram (FIG. 3) of the server is now explained. Event detection software 202 and a monitoring agent 204 are running on the operating system (OS) 200. The event detection software 202 may be publicly known software capable of detecting unauthorized events such as the invasion of a computer virus and other events.

The monitoring agent 204 performs predetermined processing upon being notified of the detection of an event from the event detection software 202. The event detection software 202 may also be realized as one module within the monitoring agent 204.

The monitoring agent 204 comprises an event control module 206, and a configuration change module 208. The event control module 206 realizes processing based on the detection of an event, and the configuration change module 208 realizes a function of executing a request for changing the server configuration from the management computer 10. Note that the modules are realized with software.

The event control module 206 comprises an event detection software coordination module 210 and an event response module 212. The event detection software coordination module 210 monitors the event detection software 202 and acquires the event occurrence status. When the event detection software coordination module 210 acquires the occurrence of an event, the event detection software coordination module 210 delivers information of the event to the event response module 212.

The event response module 212 performs predetermined processing based on the contents of the event. The event response module 212 controls the blocking or reopening of one or more ports of the server against a computer virus (unauthorized event). The ports include a management port which is connected to the management LAN, and a service port which is connected to the external LAN. When the event response module 212 determines that an unauthorized event has occurred, the event response module 212 blocks the service port (NIC 100) and the management port (NIC 114) of the server (operating system) in which the unauthorized event was detected.

The event response module 212 refers to the port configuration table shown in FIG. 4, and determines the ports to be blocked or reopened, and the order in which the plurality of ports are to be blocked or reopened. The port configuration table retains information related to the ports of the operating system, and may be stored in the memory 106. The default values of the port configuration table may be set by the server administrator at the time the operation of the server is commenced.

The port configuration table is configured from management information including the identifier of the port, the IP address of the port, the current status of the port, and the type of the port. When the event response module 212 determines that an unauthorized event has occurred, the event response module 212 blocks the ports in the following order; specifically, the event response module 212 foremost blocks management port (NIC 114) which is connected to the operating system, and subsequently blocks the service port (NIC 100) which is connected to the operating system. The reason that the ports are blocked in this order is to preferentially prevent the propagation of the unauthorized event to the management computer 10. Note that, when the status of the port is changed, the event response module 212 updates and registers the new status (status after the change) in the port configuration table. The port (management port (NIC 116)) which is connected to the BMC 112 is not blocked.

The BMC 112 does not comprise a service port. The operation of the computer system includes the restoration of the server, which was isolated from the network, to the network. When the event response module 212 determines that a server restoration event has occurred, the event response module 212 reopens the management port (NIC 114), additionally processes the change request from the management computer 10 to change the configuration of the network between the restored server and the other servers, and thereafter reopens the service port (NIC 100).

The event response module 212 can exchange information with the BMC 112 based on the IPMI command. When the event response module 212 determines the content of the event, the event response module 212 sets the content of the event in the IPMI command, and notifies the IPMI command to the BMC 112 via the IPMI driver 214. Accordingly, the event response module 212 comprises an IPMI control module.

The IPMI command includes an OEM area that can be defined by the user, and the parameter groups that are set in the OEM area are sometimes collectively referred to as an OEM command. As an example, the OEM area comprises a parameter indicating the attribute of the OEM command, a parameter indicating the type of the occurred event, and a parameter indicating event-related information such as the entry route (for instance, MAC address) of the unauthorized event (computer virus). The parameter indicating the attribute is, for instance, 1 byte within the OEM area (C0h-FEh), and the parameter indicating the type of the occurred event is similarly 1 byte, and the parameter indicating the additional information is 6-32 bytes.

FIG. 5 is a diagram showing an example of the OEM command. The area indicated with reference numeral 500 is the area indicating the attribute of the OEM command, and the parameter of c0 indicates that the attribute is related to security. "0x01" (502) indicates the parameter corresponding to the infection of the computer virus as the event, and "0x01 0x02 0x03 0x04 0x05 0x06" (504) indicates the entry route (MAC address) of the computer virus.

The event response module 212 determines the parameters of the occurred event according to the conversion table. FIG. 6 is a diagram showing an example of the conversion table. There are a plurality of types of occurred events such as a computer virus (hereinafter sometimes simply referred to as a "virus"). Which event has occurred among the plurality of types of events is determined based on event detection software. When the event response module 212 recognizes the type of event, the event response module 212 determines the parameter 502 of the IPMI command based on the conversion table.

The BMC 112 can convey the server's hardware information and occurred event information to the management computer 10 according to an SNMP (Simple Network Management Protocol). The BMC 112 forms an SNMP agent 218 according to the SNMP, and further comprises an IPMI command control module 216.

The IPMI command control module 216 comprises an IPMI command reception control module 217, and converts the received IPMI command into SNMP management information or creates SNMP management information from the IPMI command, and notifies the SNMP management information to the SNMP agent 218.

The SNMP agent 218 notifies information related to the occurrence of an event, together with the hardware management information, to the SNMP manager of the management computer 10 based on the SNMP trap. The SNMP agent 218 refers to the address table and determines the IP address of the port of the SNMP manager, additionally refers to an MIB (Management Information Base) as the SNMP management information and creates an SNMP trap, and sends the SNMP trap to the SNMP manager from the port (NIC) 116 of the BMC which is different from the port (NIC) 114 of the operating system.

The IPMI command reception control module 217 records event information such as the parameters and entry address of the unauthorized event from the IPMI command to the MIB object. The MIB is a database storing the server's management information, and it will suffice so as long as event-related information is defined in an area of a private MIB or an extended MIB. The SNMP agent 218 refers to the MIB, and creates and sends the SNMP trap. The address of the SNMP trap is configured from one or more IP addresses, and may be set based on the user's manual operation. The MIB may also be stored in the BMC's register.

The SNMP trap includes an MIB object ID (OID) which stores the parameters of the unauthorized event and the entry address of the unauthorized event. When the SNMP trap is generated by an unauthorized event, the SNMP agent 218 sends the SNMP trap as alert information to the SNP manager (management computer 10). Because the MIB of the SNMP manager is synchronized with the MIB of the SNMP agent, the SNMP manager can learn the contents (parameters) of the unauthorized event and the entry route (address) of the unauthorized event by referring to the MIB based on the OID of the SNMP trap. Note that the transmission of the management information and the event information from the BMC 112 to the management computer 10 may also be executed based on an IPMI command that is compliant with the IPMI.

In the foregoing explanation, while the configuration change module 208 described above received a request from the management computer 10 for changing the server configuration and executed the configuration change, the term "configuration change" includes the processing of applying a secure network, without no possibility of being invaded by an unauthorized event, to one or more servers (for the sake of convenience, these servers are hereinafter referred to as "robust servers" or "robust operating system (robust OS)") which are not affected by the unauthorized event, but excluding the server in which the unauthorized event was detected, and causing the servers which are not affected by the unauthorized event to continue providing services. The application of the secure network includes, for instance, the setting of a VLAN (Virtual LAN) in the switch 18 and the robust servers.

The configuration change module 208 comprises a configuration change request reception module 220 which receives a configuration change request issued by the management computer from the port (NIC 114) of the operating system, and a configuration change execution module 222. When the configuration change reception module 220 receives the foregoing configuration change request, the configuration change reception module 220 requests the configuration change execution module 222 to change the configuration. The configuration change execution module 222 executes processing for realizing the foregoing secure network configuration based on the configuration change request (command) from the management computer 10. An example of this processing includes setting a tag VLAN which is assigned to a frame, as the VLAN management information, in the network configuration management table.

The management computer 10 is now explained. Because the hardware block configuration of the management computer is the same as or similar to that of the service server described above, the explanation thereof is omitted. Unlike the service server, the management computer does not necessarily need to be equipped with a BMC, but the management computer is not precluded from comprising a BMC.

Figure 7:
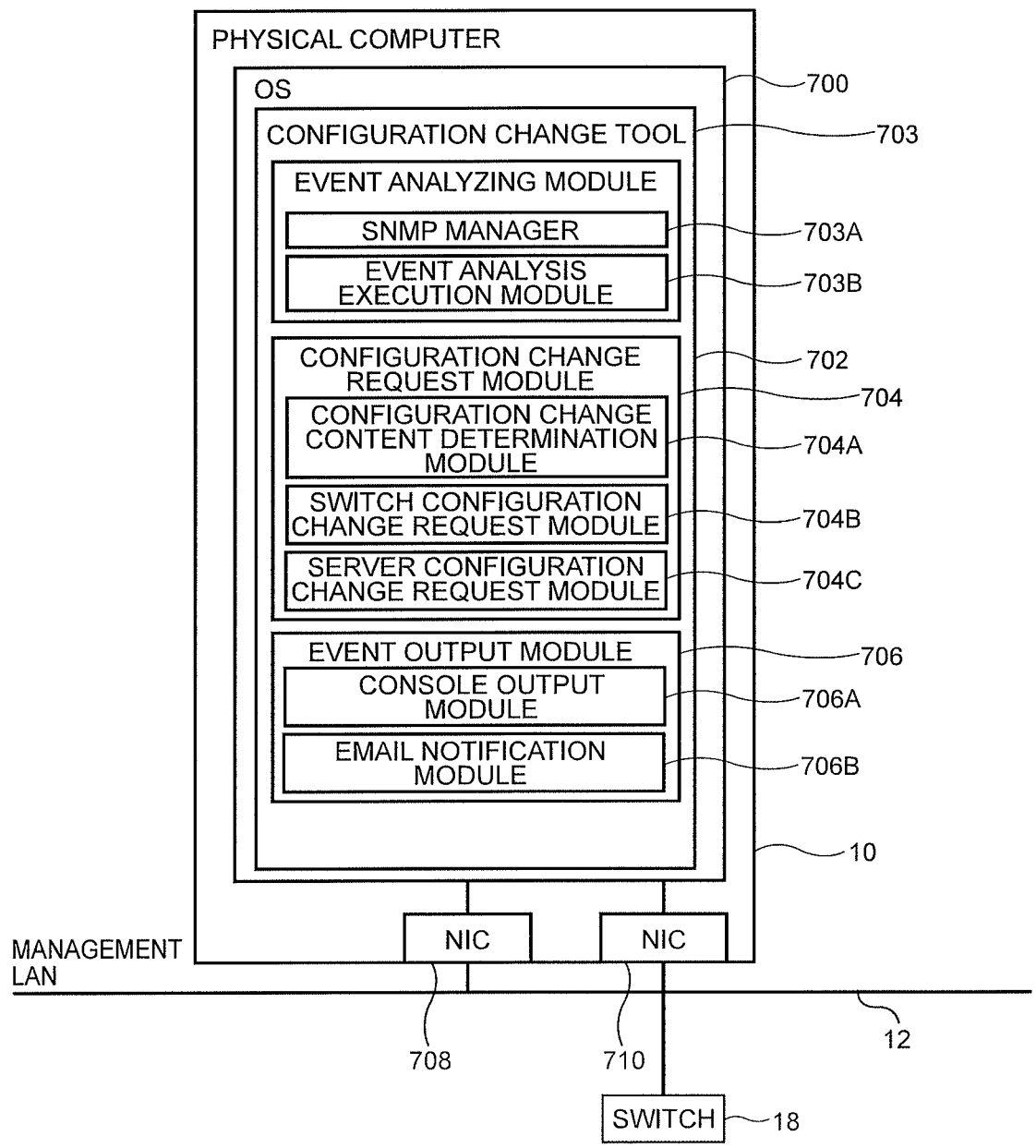
FIG. 7 is a diagram showing an example of a functional block of the management computer.

The functional block of the management computer 10 is now explained. FIG. 7 is a functional block diagram of the management computer. When the port of the server in which an unauthorized event occurred is blocked and the server is isolated from the computer system, the management computer 10 acquires the occurrence of the unauthorized event and the entry information of the unauthorized event from the BMC 112 of that server. Furthermore, the management computer 10 blocks the problematic port of the switch 18, which is the infection route of the unauthorized event, to prevent the spreading of the infection, and connects the servers in which the unauthorized event was not detected to a secure network which is independent from the service server in which the unauthorized event occurred so that the provision of services can be continued.

This is now explained in further detail. The operating system (OS) 700 of the management computer 10 realizes a configuration change tool 702 for changing the network configuration of the server 2 (3) in which an unauthorized event has not occurred, and the switch 18. The configuration change tool 702 is configured from a plurality of programs as modules which are each explained below.

The configuration change tool 702 comprises an event analyzing module 703, and the event analyzing module 703 comprises an SNMP manager 703A and an event analysis execution module 703B. The SNMP manager 703A receives the SNMP trap sent from the SNMP agent, and requests the event analysis execution module 703B to analyze the event. The event analysis execution module 703B analyzes the event and requests the configuration change module 704 to perform processing for changing the network configuration of the plurality of robust servers.

The SNMP manager 703A recognizes the contents of the event (event parameters) corresponding to the SNMP trap received from the SNMP agent by referring to the MIB. The event analysis execution module 703B refers to the command table, or the event response table described later, based on the request from the SNMP manager 703A, determines the event based on the command parameters and analyzes the event, and requests the configuration change request module 704 to perform the contents of the configuration change that was determined.

Table 1 shows an example of the analysis result of the event performed by the event analysis execution module 703B. The event analysis execution module 703B rewrites the management object table described later based on the analysis result.

TABLE 1

| IP address of entry source of unauthorized event (IP address of external port of switch) | SNMP trap source address (BMC IP address) | Occurred event |
|---|---|---|
| 10.11.0.1 | 192.168.0.1 | Virus infection |

The configuration change tool 702 comprises a configuration change request module 704 which requests a configuration change of the switch and the robust OS which are to be managed for the configuration change. The configuration change request module 704 configures a configuration change content determination module 704A. The configuration change content determination module 704A determines the configuration change content based on the event response table.

The event response table is a table indicating how the network configuration of the server should be changed in response to the occurred event. FIG. 8 is a diagram showing an example of the event response table. This table is configured from an event parameter, an "occurred event" corresponding to that parameter, and a "configuration change content" to be implemented in response to the occurred event.

In the configuration change content column, different configuration change contents are defined for the switch to undergo the configuration change, or the server (operating system (OS)) to be managed. The operating system to be managed refers to the operating system or its servers which are unrelated to the unauthorized event.

The configuration change content is configured from a "case" which indicates the set environment, and "action" which indicates the content of the configuration change corresponding to that environment. The event response table includes, as unauthorized events, the detection of a computer virus, unauthorized access, and Dos attack, and includes, as other events, the restoration of the blocked operating system (restoration from abnormality). The events are not limited to the foregoing examples.

The term "configuration change" includes the setting of a VLAN between the switch 18 and the operating system of the service server 1 (2, 3), as well as the change of that setting. The event response table differentiates the service servers managed by the management computer 10 based on their operating system, and differentiates the operating system in which an unauthorized event (computer virus) is involved and an operating system in which an unauthorized event is not involved by indicating the former as "infected OS" and the later as "robust OS".

The "case" column of "switch" stores information for isolating the infected OS from the robust OSs and configuring the network of only the robust OSs based on the VLAN setting or the change thereof. The VLAN setting includes the setting of a port VLAN and the setting of a tag VLAN. By causing the VLAN ID of the plurality of robust OSs and the VLAN ID of the switch to coincide, it is possible to isolate the infected OS and configure the network of only the robust OSs.

As described above, the event analysis execution module 703B updates the management object table based on the entry route information of the unauthorized event, and the detection information of the server (operating system) in which an unauthorized event was detected, via the SNMP trap. The configuration change request module 704 determines the management object to which the configuration content determined by the configuration change content determination module 704A should be requested based on the management object table.

The management object table manages information related to the management object (server, switch). FIG. 9 is a diagram showing an example of the management object table. The management object identifier is information for identifying the operating system and switch to be managed, and is a unique value set in the operating system and switch such as a computer name or a switch name. The management object identifier is, for example, set by the configuration change request module 704 before the commencement of operation of the computer system, or updated when the operation mode of the computer system is changed.

The BMC IP address is set by the management user in advance. The occurred event is the event that occurred in the server to be managed. The default is normal, and is updated by the event analysis execution module 703B during the operation of the computer system as a result of the SNMP manager 703A receiving the SNMP trap.

The OS port IP address is the IP address that is set to the port of the operating system of the service server. For example, by the operating system of the management computer 10 issuing a discovery command to the IP address of the respective management ports of the service server and switch as the management objects, the IP address of the service port can be acquired from the operating system of the service server, and the IP address of the external port and the internal port can be acquired from the switch. The IP address of the management ports of the service server and the switch is set by the user.

The port type indicates the usage of the set port, and is management or service. The configuration change request module 704 sends a configuration change request to the management of the server or switch to be managed. The port type is set by the management user at the start of system operation or upon the change of the operation mode thereof, or may be decided from the IP address of the port acquired based on the discovery command. The port status being invalid means that the port has been blocked.

The default of the port status is set to valid. The port status is updated by the configuration change request module 704 during the operation of the computer system. The configuration is the configuration information of the management object. The configuration that is set in advance by the administrator is updated by the configuration change request module during the operation of the computer system when the configuration change of the management object is completed. The configuration includes the VLAN setting information (VLAN information of FIG. 8).

The configuration change content determination module 704A determines to set the status of the external port of the switch, which is a route related to the unauthorized event, to invalid (block), and determines to set the status of the internal port of the switch, which leads to the server in which an unauthorized event occurred, to invalid (block). The configuration change content determination module 704A changes the port status of the switch of the management object table.

The configuration change content determination module 704A changes the port status of the server in which an unauthorized event was detected to invalid (block). Note that, while the management object table of FIG. 9 does not indicate information of the switch, the information of the switch is as per the switch configuration table described later.

The configuration change content determination module 704A refers to the management object table (FIG. 9) for changing the port status of the switch, and extracts, for instance, the information indicated in Table 2 below as the information pertaining to the external port of the switch which was used in the invasion of the unauthorized event.

TABLE 2

| Port IP address | Description of occurred event | VLAN type | VLAN ID |
|---|---|---|---|
| 10.11.11 | Virus infection | Port VLAN | 110 |
| | | Tag VLAN | 120 |

Furthermore, the configuration change content determination module 704A refers to the management object table and extracts, for instance, the information indicated in Table 3 below as the information pertaining to the normal external port of the switch which is unrelated to the unauthorized event.

TABLE 3

| Port IP address | Description of occurred event | VLAN type | VLAN ID |
|---|---|---|---|
| 10.11.2.2 | Normal | Port VLAN | 110 |
| | | Tag VLAN | 120 |

Subsequently, the configuration change content determination module 704A determines to block the external port that was infected by the virus, and determines, for instance, as shown in Table 4 below, the VLAN information (VLAN ID) of the normal external port of the switch and the internal port to be connected to the OSs to be managed (robust OSs) so that a VLAN is formed only between the robust OSs and the external LAN (external server) that is not the source of invasion of the unauthorized event. The configuration change content determination module 704A changes the event response table (FIG. 8) and the management object table (FIG. 9) based on the determined contents.

TABLE 4

| Switch setting | | | OS to be managed |
|---|---|---|---|
| VLAN type | VLAN ID | Necessity of blocking | Tag VLAN ID |
| Port VLAN | 130 | Not required | — |
| Tag VLAN | 140 | | 140 |

The configuration request module 704 comprises a switch configuration change request module 704B which issues a configuration change command to the switch 18, and a server configuration change request module 704C which issues a configuration change command to the configuration change request reception module 220 of the monitoring agent 204 of the server to be managed.

The switch configuration change request module 704B refers to the management object table and creates a switch configuration change request command to realize, for instance, the switch configuration shown in Table 5 below, based on the VLAN setting information of the VLAN set in the switch to be managed, and outputs the created command to the management port 18C of the switch 18.

TABLE 5

| IP address of port to be changed | Switch setting | | |
|---|---|---|---|
| | VLAN type | VLAN ID | Necessity of blocking |
| 10.11.2.2 | Tag VLAN | 130 | Not required |
| | Port VLAN | 140 | Not required |

The controller of the switch 18 changes the switch configuration. In other words, the controller of the switch executes the switch configuration change program, and, based on the switch configuration change request command, blocks the problematic external port, sets the port VLAN ID to the interface of the external port and the internal port subject to the VLAN setting, and sets the tag VLAN ID to the frame processing system.

Subsequently, the configuration change content determination module 704A refers to the management object table to identify the server to be managed that is subject to the configuration change, and extracts the IP address of the internal port of the switch in which the VLAN of the switch is set. Furthermore, the configuration change content determination module 704A refers to the management object table, and extracts, for instance, as shown in Table 6 below, the port information of the server to be managed which is connected to the internal port. When there are a plurality of internal ports, the configuration change content determination module 704A extracts the port information of the server to be managed for each of such internal ports, for example, as shown in Table 6.

TABLE 6

| | Server to be managed | |
|---|---|---|
| Server identifier | Management port IP address | Task port identifier |
| Server 1 | 192.168.0.1 | eth0 |
| | | eth1 |
| Server 2 | 192.168.0.2 | eth01 |

The server configuration change request module 704C refers to the management object table and additionally refers to the VLAN setting information based on the identifier of the server to be managed, and creates a server configuration change request command for realizing the configuration change of the server, for instance, as shown in Table 7 below, and outputs the created command to the management port 2B (3B) of the server to be managed.

TABLE 7

| Management port IP address | Task port identifier | Tag VLAN ID |
|---|---|---|
| 192.168.0.1 | eth0 | 130 |
| | eth1 | |
| 192.168.0.1 | eth01 | 130 |

The configuration change execution module 222 of the server that received the server configuration change request command sets the tag VLAN ID in the frame processing system. Note that the reason why the port VLAN ID is not included in the server configuration change request command is because it would be sufficient so as long as the port VLAN ID is set to the internal port of the switch to be connected to the service port of the server.

The configuration change tool 702 further comprises an event output module 706 for enabling the user to recognize the event occurrence status and the configuration information. The event output module 706 comprises a console output module 706A, and an email notification module 706B. The console output module 706A refers to the management object table, and displays the occurred event and the configuration change content of the management object on an output medium, and the email notification module 706B refers to the management object table and sends the occurred event and the configuration change content of the management object to the service administrator via email.

The console output module 706A displays on an output medium, as a list of the configuration information to be managed, the occurred event such as a virus, the configuration change content such as blocking the port, and the consequently changed sections. Table 8 shows such an example of the foregoing list.

TABLE 8

| | | List of configuration information to be managed | | | | | |
|---|---|---|---|---|---|---|---|
| Identifier of device to be managed | Occurred event | OS port IP address | Port type | Port status | VLAN ID | Description of configuration change | Time of configuration change/ occurrence of event |
| Server 1 | Normal | 192.168.0.7 | Management | Valid | 100 | — | — |
| | | 10.0.0.1 | Task | Valid | 120 | Change of VLAN ID | 2010/10/10 10:00:01 |
| Server 2 | Virus infection | 192.168.0.8 | Management | Invalid | 100 | Blocking of port | 2010/10/10 10:00:00 |
| | | 10.0.0.2 | Task | Invalid | 110 | Blocking of port | 2010/10/10 10:00:00 |
| Server 4 | Normal | 192.168.0.10 | Management | Valid | 100 | — | — |
| | | 10.0.0.5 | Task | Valid | 120 | Change of VLAN ID | 2010/10/10 10:00:01 |

The console output module 706A may display the foregoing list actively each time the management computer 10 changes the server configuration, or the foregoing list may be displayed by being triggered by the server administrator's operation. The contents to be displayed may be the configuration information of all management objects, or the configuration information of only the servers that underwent a configuration change. Moreover, the configuration change or the event occurrence time may be output.

The process of changing the configuration of the switch for isolating the infected OS and forming a VLAN network in the plurality of robust OSs is now explained in detail. The configuration of the switch is changed by the switch configuration change request module 704B as described above. The configuration change tool 702 manages the switch configuration information based on the switch management table.

Figure 11:
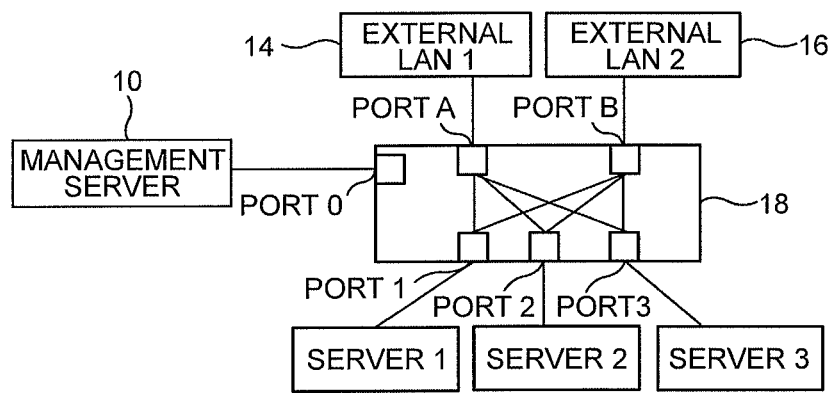
FIG. 11 is a block diagram showing the configuration of the switch illustrated in FIG. 10.

The switch configuration change request module 704B issues a configuration change command to the switch 18 and updates the registered contents of the switch management table. The switch management object table for managing the switch configuration is shown in FIG. 10. FIG. 11 is a block diagram of the switch configuration registered in the foregoing table.

The switch management object table may also be stored in an internal memory of the management computer 10. When the administrator inputs the IP address of the management port of the switch 18 to the configuration change content determination module 704A of the management computer 10, a discovery command is issued to the switch 18, and the configuration information of the port is acquired from the switch 18 and registered in the switch management table. For details regarding the respective items of the switch management object table, refer to the management object table (FIG. 9) described above. The VLAN ID is the ID of the port VLAN.

FIG. 11 illustrates an environment in which the external port A connected to the external LAN 1 (or external server 1) 14 and the external port B connected to the external LAN 2 (or external server 2) 16 are respectively routed to the internal port 1, the internal port 2, and the internal port 3. The internal port 1 is connected to the server 1, the internal port 2 is connected to the server 2, and the internal port 3 is connected to the server 3.

A VLAN is set between the ports which are set with the same VLAN ID. The port 0 of the switch is connected to the management computer 10. FIG. 10 and FIG. 11 show that the servers 1 to 3 are operating normally without being influenced by an unauthorized event.

Figure 12:
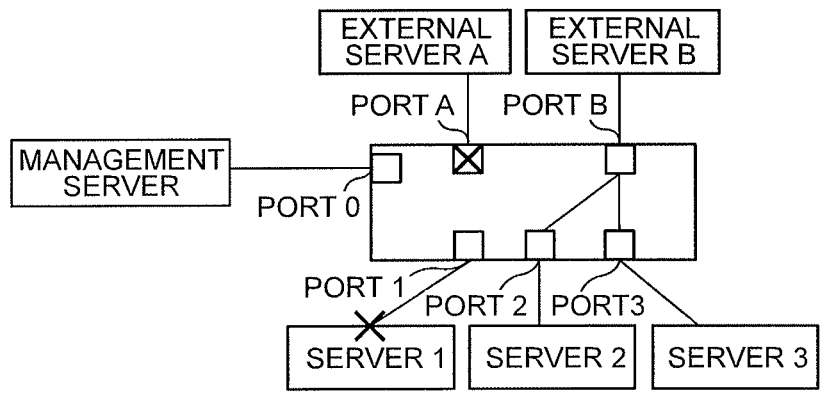
FIG. 12 is a diagram showing another example of the switch management object table for managing the configuration of the switch.

Next, as shown in FIG. 12, when a computer virus is detected by the monitoring agent of the server 1, the service port of the server 1 (port connected to the internal port 1) is blocked, and the port A (entry route of computer virus) is additionally blocked by the management computer 10. Subsequently, the management computer 10 sets a VLAN that is different from the VLAN that was set to the port of the infected server 1 in order to form a network among the port B and the server 1 and the server 2, which does not include the server 1 and the port A, and thereby changes the switch management table as shown in FIG. 13.

In FIG. 13, "130" of the VLAN ID is the port VLAN ID of the VLAN that was set to the port B, the server 1 and the server 2. Note that, when the port of the server is blocked, even if the port of the switch is valid, the server and the VLAN are not set.

Another example of the switch configuration change is now explained. According to the switch block configuration shown in FIG. 14, the port A is routed to the port 1, and the port B is routed to the port 2 and the port 3 within the switch. This switch configuration will be explained with reference to the configuration table of FIG. 15. In the switch, the VLAN (VLAN ID: 110) of the port A and the port 1, and the VLAN (VLAN ID: 120) of the port B, the port 2, and the port 3 are respectively set.

Subsequently, when the server 1 detects a computer virus via the port A, the service port of the port A and the server 1 is blocked. Here, because the VLAN ID (110) of the port A and the port 1, and the VLAN ID (120) of the port B, the port 2, and the port 3 do not overlap, the VLAN of the port A and the port 1 is cancelled, but the VLAN of the port B, the port 2, and the port 3 is maintained (refer to FIG. 16).

Figure 17:
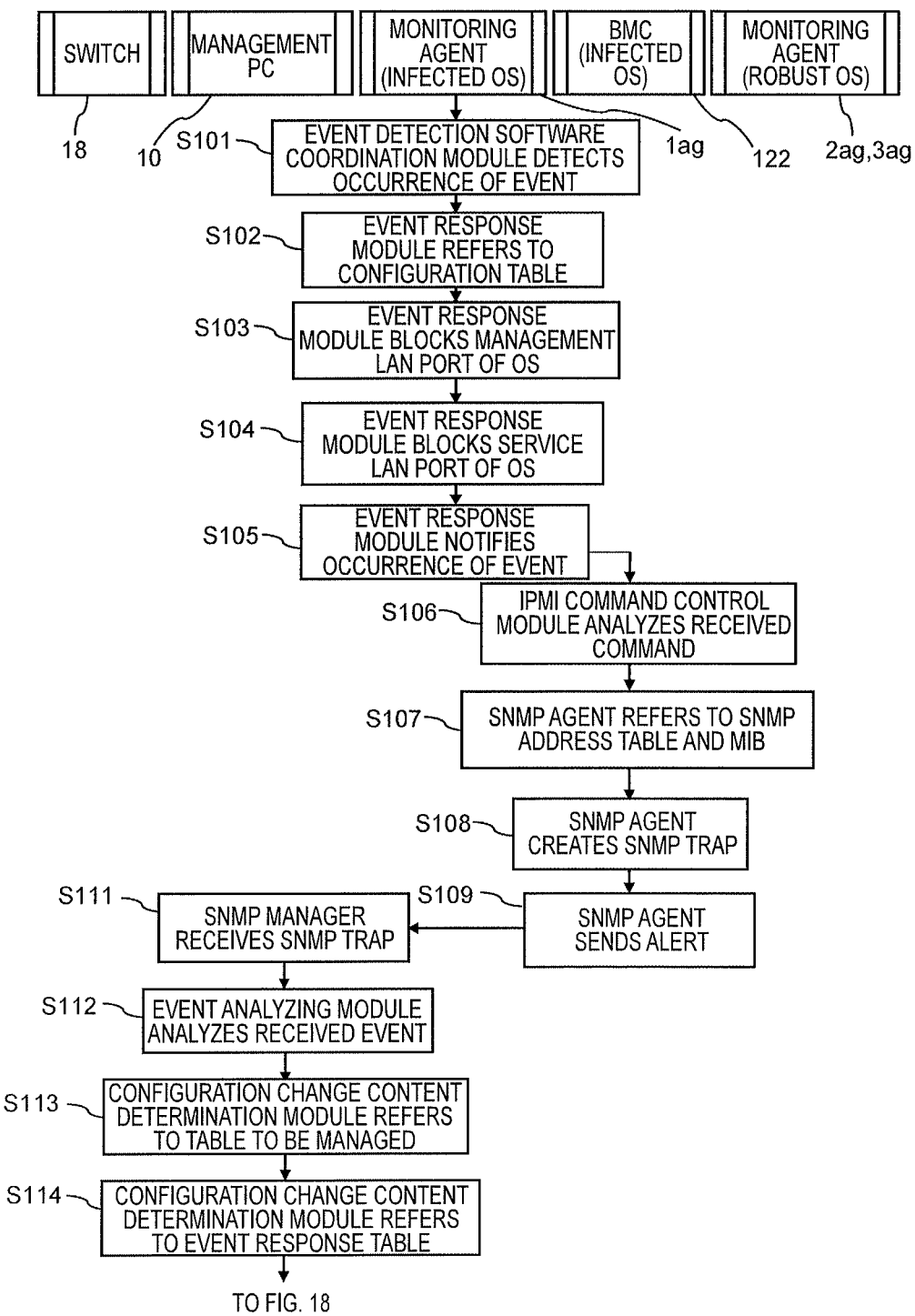
FIG. 17 is a flowchart of the process from the time that the operating system of the server is infected by a computer virus to the time that the infected operating system is isolated from the network.
Figure 18:
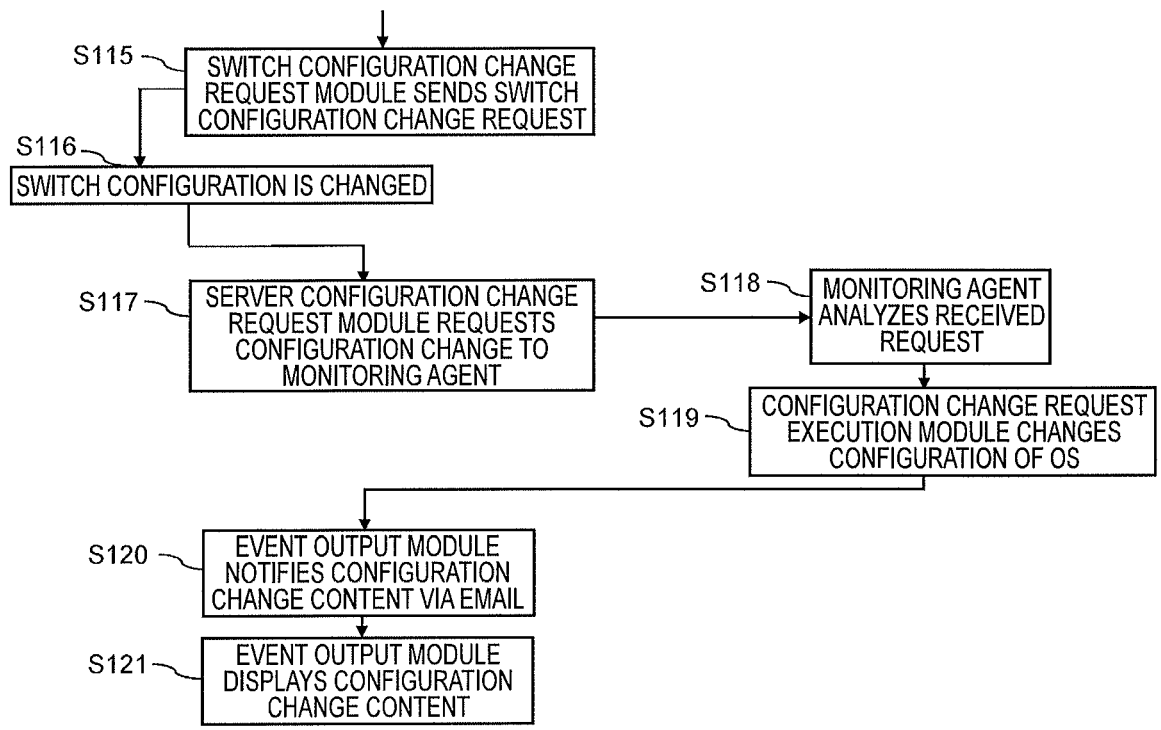
FIG. 18 is a flowchart that is subsequent to FIG. 17.

The operation of the overall computer system is now explained once again. FIG. 17 and FIG. 18 are flowcharts showing the flow from the time that the operating system of the server is infected by a computer virus to the time that such operating system is isolated from the network.

Foremost, when the event detection software coordination module 210 (FIG. 3) of the monitoring agent 1ag of the infected OS (OS1 of FIG. 1) detects an event occurrence (computer virus) (S101), the event response module 212 refers to the port configuration table (FIG. 4) (S102), and blocks the management port 1B to the management LAN 12 (FIG. 1) of the infected OS (S103).

Subsequently, the event response module 212 refers to the port configuration table, and blocks the service port 1A to the switch 18 of the infected OS (OS1) (S104). Furthermore, the event response module 212 uses the OEM area of the IPMI command and notifies the event (detection of a computer virus) to the BMC 112 within the same server (S105).

Upon receiving the foregoing notice, the IPMI command control module 216 of the BMC 112 analyzes the received command (S106). The SNMP agent 218 of the BMC 112 refers to the SNMP address table and the MIB (S107), creates an SNMP trap (S108), and sends the created SNMP trap as an alert to the SNMP manager 703A (FIG. 7) (S109).

When the SNMP manager 703A receives the SNMP trap (S111), the event analyzing module 703B analyses the event (S112), and the configuration change content determination module refers to the event response table and determines the configuration change content. Subsequently, the configuration change content determination module 704A refers to the management object table (FIG. 9) (S113) and additionally refers to the event response table (FIG. 8) (S114), and thereby determines the management object to undergo a configuration change, and determines the configuration change content.

Subsequently, the switch configuration change request module 704B updates the switch management object table (FIG. 10) based on the configuration change content, and sends a configuration change command to the management port (port 0) of the switch (FIG. 11) (S115). The controller in the switch blocks the entry port of the computer virus among the ports within the switch based on the received command, and changes the VLAN of the ports if such change is required upon setting the VLAN in the robust OSs (S116).

Furthermore, the server configuration change request module 704C sends a configuration change request to the monitoring agents 2ag, 3ag via the management port 114 of the operating system of the robust OSs (S117). For example, there may be cases where the server configuration change request module 704C requests the management agent of a robust OS to change the tag VLAN ID.

The configuration change request reception module 220 of the monitoring agent of the robust OS receives and analyzes the configuration change request (S118), and the configuration change request execution module 222 changes the VLAN configuration of the operating system according to the VLAN settings of the switch 18 (S119). Subsequently, the event output module of the management computer 18 outputs the configuration change content (S120, S121).

The operation of restoring the blocked server to the computer system is now explained. Restoration is managed as one of the events. When the monitoring agent of the blocked server detects that the event detection software has eliminated the computer virus, the monitoring agent reopens the blocked ports in order from the management ports to the service ports, and notifies the parameters of the restoration from abnormality (FIG. 6) to the BMC 112 based on the IPMI command.

The configuration change request module 704 of the management server that received the alert (SNMP trap) refers to the management object table and changes the management object table based on the management information for changing the infected OS to a robust OS, and applies the VLAN management information to the restored OS in order to incorporate the restored OS into the VLAN of the robust OSs. The configuration change request module 704 sends a configuration change request to the monitoring agent of the restored OS.

The monitoring agent changes the configuration of the network according to the configuration change information received from the management server 10. Note that, in order to continue preventing the invasion of a computer virus, it would be desirable to refrain from reopening the closed external port in the switch. It is thereby possible to incorporate the restored OS in the same network as the robust OSs and enable the restored OS to resume the provision of services.

Figure 19:
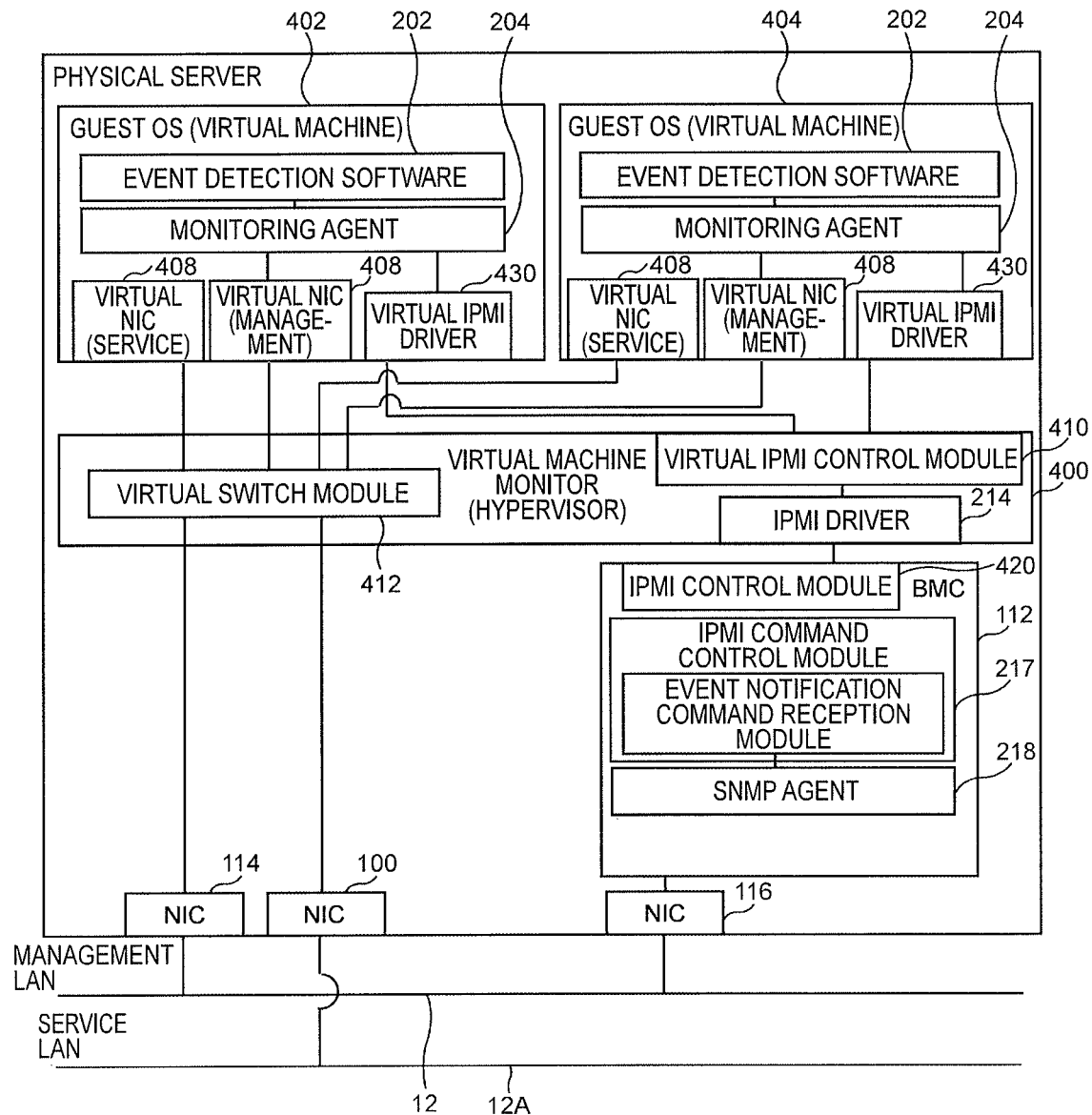
FIG. 19 is a functional block diagram of a virtualized server.

The present invention can also be applied to a virtualized server. FIG. 19 is a functional block diagram of a virtualized server. A plurality of virtual machines 402, 404 (guest OSs) are generated in one physical server based on a virtual machine monitor (hypervisor) 400, and an operating system is running on each of the virtual machines.

When an event occurs, foremost, the monitoring agent 204 blocks the port of the operating system. Here, the virtual NIC 408 (service) and the virtual NIC 408 (management) recognized by the guest OSs are blocked. A virtual NIC is an NIC that is used by the guest OSs, and is an emulation of a physical NIC emulated by the virtual machine monitor.

Because a virtual NIC is recognized in the same manner as a physical NIC by the guest OSs, the monitoring agent 204 can block the port (virtual NIC) based on the same operation performed in a physical environment. The virtual machine monitor 400 is a module which realizes a virtual environment, and generates virtual machines and controls the resources used by the guest OSs.

The virtual IPMI control module 410 is an emulation of the IPMI control module 420 of the BMC 112 emulated by the virtual machine monitor 400. The virtual IPMI control module 410 may also include a virtual IPMI driver on the virtual machine OS. In the foregoing case, the IPMI command from a guest OS is delivered to the BMC 112 without going through the virtual machine monitor in the same manner as a physical environment.

The virtual switch module 412 is a logical switch module that is incorporated into the virtual machine monitor 400. In order to use one physical NIC in a plurality of guest OSs, the packet received by the physical NIC is routed. The guest OSs communicate with the outside via the virtual switch module 412.

The monitoring agent 204 issues an IPMI command, and notifies the BMC 112 of the occurrence of an event. In a virtual environment, the event occurrence is notified to the BMC 112 from the virtual IPMI driver 430 via the virtual IPMI control module 410 and the IPMI driver 214 of the virtual machine monitor 400. The virtual IPMI driver 430 is used by the guest OSs. The virtual IPMI driver 430 delivers the IPMI command executed on the guest OS to the virtual IPMI control module 410. Note that reference numeral 12A represents a service LAN that is connected to the switch 18.

The operation of isolating an operating system from the network and forming a network of other operating systems once the operating system is infected with a virus is executed for each guest OS (virtual machine), and is basically the same as the explanation of the operating system in a physical environment (FIG. 17, FIG. 18). However, the virtual switch configuration is changed by the configuration change module 704 so that the configuration change request from the management computer 10 can be routed to a robust guest OS.

In the foregoing explanation, the configuration change request from the management computer 10 to the server 2 (3) was sent to the management port 2B (3B) of the operating system of the server by using a command of the operating system, but this request may also be sent to the BMC 112 of the server. This configuration implies the replacement of the means for issuing a command from the management computer to the server. The command from the configuration change request module 704 of the server to the BMC may be sent using a system which uses the SNMP trap of the SNMP interface and the MIB, or a system which uses the IPMI interface.

With the former system, an SNMP trap for the configuration change request is sent from the SNMP manager of the management computer to the SNMP agent of the server. The SNMP agent generates an IPMI command from the SNMP trap. The IPMI control module of the monitoring agent analyzes the IPMI command and extracts the configuration change request.

With the latter system, in this mode, the configuration change request module 704 of the management computer uses an IPMI interface in substitute for the SNMP, and issues an IPMI command to the IPMI command reception control module 217 of the BMC of the server. The management computer uses the OEM area of the IPMI command and sends a configuration change request to the server. The IPMI command includes the command type (configuration change request command), port type (0: block, 1: valid), port type (management or service port), and VLAN ID. The configuration change request reception module 220 of the management agent of the robust OS monitors (polls) the BMC and thereby confirms/recognizes the necessity of the configuration change. Upon performing the foregoing monitoring, the configuration change request reception module 220 sends a configuration change content request to the BMC based on the IPMI command, and determines the configuration change content based on the response to the command from the BMC. Subsequently, the configuration change execution module 220 executes the configuration change.

INDUSTRIAL APPLICABILITY

The present invention relates to a computer system, and is particularly suitable as a computer system comprising a service computer capable of performing predetermined services, and a management computer which manages the service computer.

The invention claimed is:
1. A computer system, comprising:
a plurality of service computers each capable of performing predetermined services; and
a management computer which manages each of the plurality of service computers,
wherein each of the plurality of service computers comprises:
a controller which executes an operating system; and
a management processor, which issues commands that are not dependent on the controller or operating system, for managing computer hardware,
a first port for connecting the controller to the management computer;
a second port, separate and independent from the first port, for connecting the management processor to the management computer;
wherein the controller executes a monitoring program which manages a plurality of detected unauthorized events;

wherein when the controller detects an occurrence of an unauthorized event, the controller:
isolates, from the computer system, the service computer in which the unauthorized event was detected, including blocking all communication via the first port without the detection of the unauthorized event being notified via the second port from the controller to the management computer by not blocking communication via the second port;
identifies, via a conversion table having a plurality of types of unauthorized events and a plurality of command parameter values each corresponding to one of the types of unauthorized events, a command parameter value corresponding to the detected unauthorized event; and
sets, into one of the commands that are not dependent on the controller or operating system, the command parameter value corresponding to the detected unauthorized event and an entry route of the detected unauthorized event;
wherein the management processor sends the one command to the management computer via the second port;
wherein, based on the command parameter value corresponding to the detected unauthorized event and an entry route of the detected unauthorized event, the management computer uses a request response table, comprising a plurality of different stored configuration change content each corresponding to a different type of unauthorized event, to request a configuration change of: a switch connected to the plurality of service computers; and the operating system, the stored configuration change content comprising a current setting of one or more system components between the switch and the operating system and the configuration change of the setting of the one or more components.

2. The computer system according to claim 1, wherein the controller notifies the information of the event detected by the monitoring program to the management processor via an interface which is not dependent on the operating system.

3. The computer system according to claim 1, wherein, when the controller detects a computer virus as the predetermined event, the controller blocks the first port for connecting to the management computer of the service computer in which the computer virus was connected, and a third port for connecting to the switch.

4. The computer system according to claim 2, wherein the management processor comprises a Baseboard Management Controller (BMC), and wherein the interface is an interface dedicated to the BMC.

5. The computer system according to claim 4, wherein the controller notifies the information of the predetermined event to the BMC by using the command which is dependent on a specification of the BMC dedicated interface and is not dependent on the controller or operating system.

6. The computer system according to claim 5, wherein the BMC, in accordance with a Simple Network Management Protocol (SNMP), notifies information of the event from an SNMP agent to an SNMP manager of the management computer based on an SNMP trap.

7. The computer system according to claim 1, wherein the management computer blocks the entry route of the event.

8. The computer system according to claim 2, wherein the management computer changes a connection relationship among the plurality of service computers so that an isolated service computer is not included.

9. The computer system according to claim 8, wherein the management computer sets a virtual local area network (VLAN), for connecting to the plurality of service computers, in the plurality of service computers that are connected so that the isolated service computer is not included, and the switch.

10. The computer system according to claim 2, wherein a plurality of guest OSs are set in at least one service computer among the plurality of service computers, and
wherein a controller of the at least one service computer monitors the predetermined events regarding each of the plurality of guest OSs.

11. The computer system according to claim 10, wherein the controller isolates, from the computer system, the guest OS in which the predetermined event was detected, without the detection of the predetermined event being notified from the controller to the management computer.

12. A method of managing a plurality of service computers of a computer system,
each service computer comprising a controller which executes an operating system and a management processor which manages hardware and issues commands that are not dependent on the controller or operating system, the method comprising:
for each service computer,
executing, via the controller, a monitoring program which manages a plurality of detected unauthorized events;
when an occurrence of an unauthorized event is detected, when the controller detects an occurrence of an unauthorized event,
isolating, the service computer from the computer system, including blocking all communication via a first port, which connects the controller to the management computer, without the detection of the unauthorized event being notified to the management computer by not blocking communication via a second port which connects the management processor to the management computer;
identifying, by the controller, via a conversion table having a plurality of types of unauthorized events and a plurality of command parameter values each corresponding to one of the types of unauthorized events, a command parameter value corresponding to the detected unauthorized event; and
setting, by the controller, into one of the commands that are not dependent on the controller or operating system, the command parameter value corresponding to the detected unauthorized event and an entry route of the detected unauthorized event;
sending, by the controller, information of the unauthorized event to the management computer via the management processor sending, by the management processor the one command to the management computer via the second port;
based on the command parameter value corresponding to the detected unauthorized event and an entry route of the detected unauthorized event, using, by the management processor, a request response table, comprising a plurality of different stored configuration change content each corresponding to a different type of unauthorized event, to request a configuration change of: a switch connected to the plurality of service computers; and the operating system, the stored configuration change content comprising a current setting of one or more system components between the switch and the operating system and the configuration change of the setting of the one or more components.

\* \* \* \* \*